UNITED STATES PATENT OFFICE.

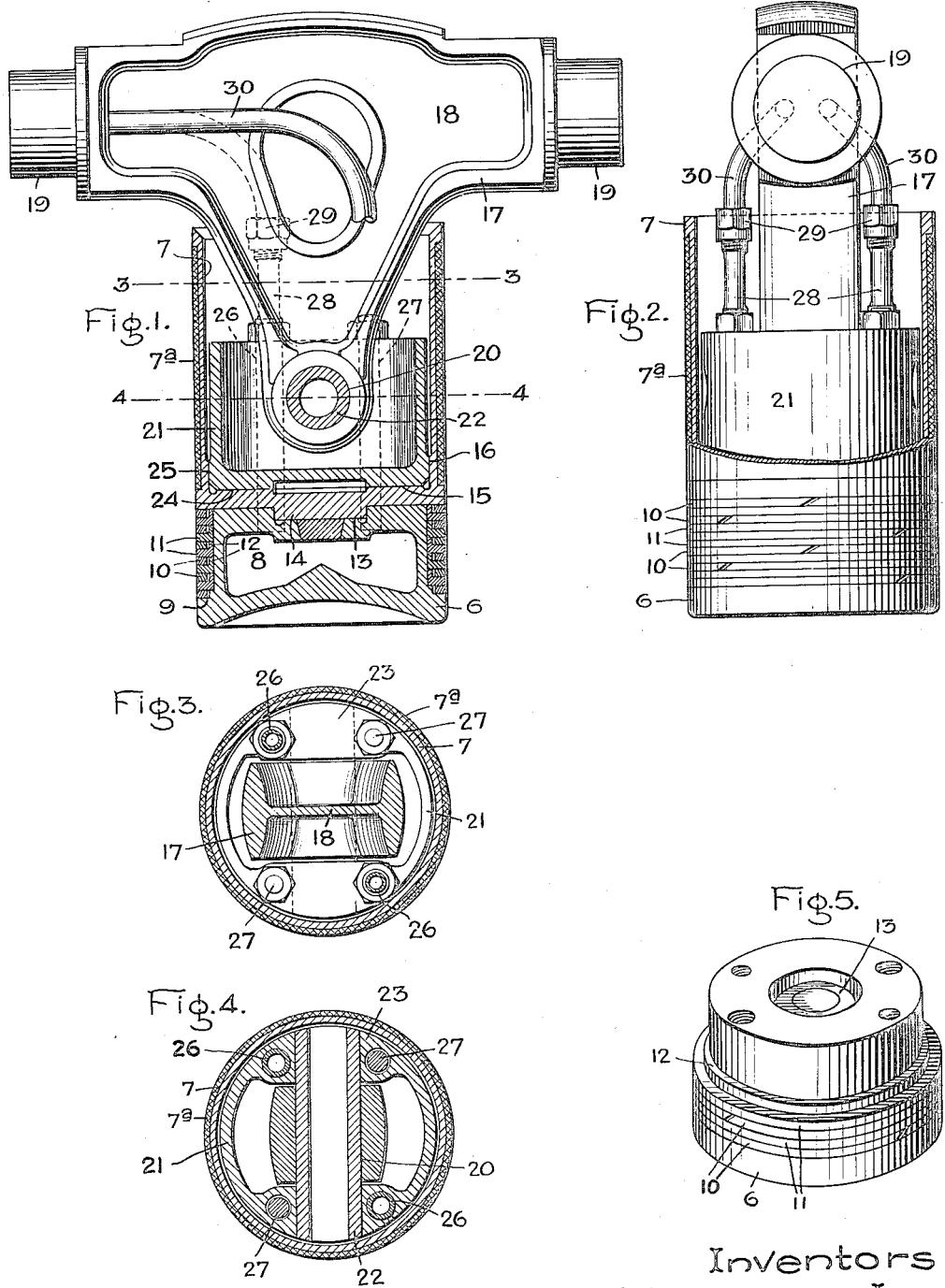

HERMANN LEMP AND HENRY W. STOCK, OF ERIE, PENNSYLVANIA, ASSIGNORS TO GENERAL ELECTRIC COMPANY, A CORPORATION OF NEW YORK.

ENGINE-PISTON.

1,212,517.  Specification of Letters Patent.  Patented Jan. 16, 1917.

Application filed June 1, 1915. Serial No. 31,377.

*To all whom it may concern:*

Be it known that we, HERMANN LEMP and HENRY W. STOCK, citizens of the United States, residing at Erie, county of Erie, State of Pennsylvania, have invented certain new and useful Improvements in Engine-Pistons, of which the following is a specification.

The present invention relates to pistons for internal combustion engines, and particularly to pistons intended for use as the upper pistons in that type of vertical engine in which each cylinder is provided with oppositely moving pistons, although it is not necessarily limited thereto.

The object of the invention is to provide an improved structure of piston.

For a consideration of what we believe to be novel and our invention attention is directed to the accompanying specification and the claims appended thereto.

In the accompanying drawing Figure 1 is a vertical sectional view of our improved piston; Fig. 2 is a side elevation partly in section and partly broken away, the view being at right angles to that of Fig. 1; Fig. 3 is a section on line 3—3 Fig. 1; Fig. 4 is a section on line 4—4 Fig. 1, and Fig. 5 is a perspective detail view of the piston head.

Referring to the drawing, the piston which is of the trunk type, is shown as comprising two main parts, the head 6 and the body 7, connected together as hereinafter described to present a perfectly smooth exterior surface. The outer portion of the body is preferably formed of babbitt as indicated at 7ᵃ. The head is hollow forming a cooling chamber or space 8 therein, and is cut away to form a shoulder 9 between which and the lower edge of the body are fastened the piston rings 10 having the spacing rings 11 between them. These spacing rings are themselves spaced apart by spacing members 12 which are preferably formed integral therewith. The upper wall of the head is formed with a depression 13 into which fits a projection 14 on the lower wall of the body 7. These parts are finished to make a true fit and serve to center the head and body relative to each other. The lower inner surface of the body is formed with an annular projection or boss 15 having a finished surface and the inner side of the wall of the body has an annular projection or boss 16 with a finished surface.

17 indicates a triangular shaped crosshead provided with a stiffening web 18 and having trunnions 19 at two of its angles upon which the side rods (not shown) are pivoted, and an eye 20 at its other angle to which is pivoted the cup-shaped member 21 by means of the hollow wrist pin 22. The member 21 is provided at two opposite points with a reinforced wall as indicated at 23, Figs. 3 and 4, and it is through this reinforced portion that the opening for the wrist pin 22 is made. The outer surface of the member 21 is provided with two finished surfaces 24 and 25 which engage the finished surfaces of the bosses 15 and 16. These surfaces serve to center and position the member 21 relative to the body 7 and to form the necessary contacting area without the necessity of finishing the entire adjacent surfaces of the two parts, as would otherwise be the case. The inner member 21 and the head 6 are fastened to the body 7 by means of bolts 26 and 27 which extend through openings in the reinforced portion of the wall of member 21 and thread into the lower wall of body 7 and head 6. Two of these bolts, as 26, are hollow and communicate at their lower ends with the cooling chamber 8 for the purpose of conveying a cooling medium to and from the head. They are each formed with an extension 28 which is coupled at 29 to a pipe 30. These pipes 30 are slightly flexible and will be pivoted at their outer ends to permit of the movements of the piston as is well understood. This use of two of the fastening bolts for conveying the cooling medium to and from the chamber 8 simplifies the structure and renders the number of parts less, thus lessening the cost of manufacture.

By the above arrangement a structure is provided in which there are no parts to keep oil tight to prevent leakage of oil to the cylinder. Any leakage of lubricant from around the wrist pin 22 will be to the interior of the body 7 and member 21; also any leakage of the cooling medium, which may be oil, will also be to the interior of the same parts. Furthermore, with this arrangement it is impossible for the wrist pin to work out as it will be held by the wall of body 7. It is also to be noted that the exterior of the piston presents a perfectly smooth unbroken surface since the cross-head is fastened to it by a means entirely within the piston body.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent of the United States, is:—

1. In a piston of the trunk type, the combination of a body member, a head fastened thereto, packing rings between the head and body member, a cup-shaped member fitted within the body member and fastened thereto, and a connecting member pivotally joined to the cup-shaped member.

2. The combination of a piston of the trunk type having a hollow head, a member fitted within the wall thereof and resting on the head, bolts securing said member to the head, some of said bolts being hollow and communicating with the space in the head for conveying cooling medium, a cross-head, and means pivotally connecting the cross-head to said member.

3. The combination of a piston of the trunk type comprising a head and a body member, a cup-shaped member fitted within the body member, bolts connecting said head, body member, and cup-shaped member together, a cross-head, and means pivotally connecting the cross-head to the cup-shaped member.

4. The combination of a piston of the trunk type comprising a hollow head and a body member, a cup-shaped member fitted within the body member, bolts connecting said head, body member, and cup-shaped member together, some of said bolts being hollow and communicating with the space in said head for conveying cooling medium, a cross-head, and a wrist pin pivotally connecting it to the cup-shaped member.

In witness whereof, we have hereunto set our hands this twenty eighth day of May, 1915.

HERMANN LEMP.
HENRY W. STOCK.